(No Model.)
W. R. & J. A. GREEN.
CULTIVATOR AND PLANTER COMBINED.
No. 418,178.  Patented Dec. 31, 1889.
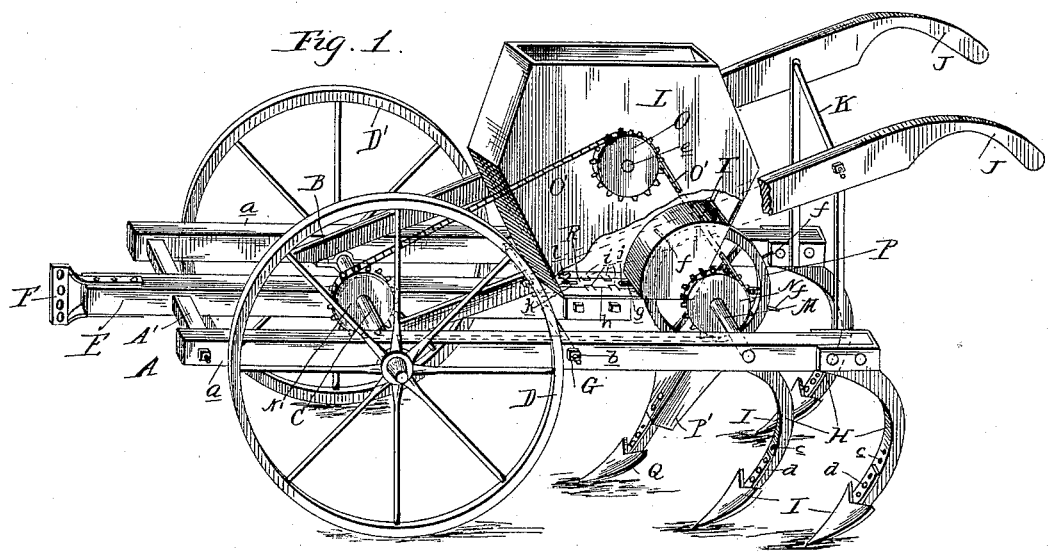
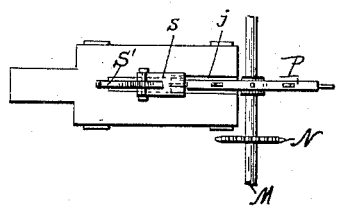
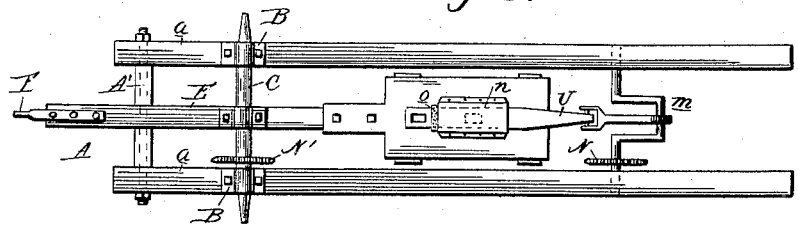
Witnesses  Inventors
William R. Green & Jas. A. Green
By their Attorney
Franklin H. Hough

UNITED STATES PATENT OFFICE.

WILLIAM R. GREEN AND JAMES A. GREEN, OF KINGSTON, TEXAS.

CULTIVATOR AND PLANTER COMBINED.

SPECIFICATION forming part of Letters Patent No. 418,178, dated December 31, 1889.

Application filed June 21, 1889. Serial No. 315,080. (No model.)

*To all whom it may concern:*

Be it known that we, WILLIAM R. GREEN and JAMES A. GREEN, citizens of the United States, residing at Kingston, in the county of Hunt and State of Texas, have invented certain new and useful Improvements in a Cultivator and Planter Combined; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in combined cultivators and planters; and it has for its object to construct a device of this character which shall be cheap and durable, of few parts, and very efficient in operation.

The invention consists in the peculiar combinations and the construction, arrangement, and adaptation of parts, all as more fully hereinafter described, shown in the drawings, and then particularly pointed out in the appended claim.

The invention is clearly illustrated in the accompanying drawings, which, with the letters of reference marked thereon, form a part of this specification, and in which—

Figure 1 is a perspective view of a cultivator and planter constructed in accordance with our invention, with parts broken away. Fig. 2 is an inverted view of the bottom of the seed-box, with the feed-wheel and its shaft shown in their relative positions. Fig. 3 is a similar view to Fig. 1 of the frame and the bottom of the seed-box and the slide and its operating mechanism as designed for a corn-planter.

Like letters of reference indicate like parts throughout the several views in which they occur.

Referring now to the details of the drawings by letter, A designates the frame, rectangular in shape and of any suitable material and size, as occasion may require. This frame is composed of the longitudinal side timbers $a$, connected together at their forward ends by means of the cross-bar A', which is so attached to the side bars as to allow a slight spreading of the rear ends thereof when necessary.

B are boxes secured to the under side of the side bars, near their forward ends, and in these boxes is journaled the axle C, which carries the wheels D and D', one of which D is fast on the axle and the other D' loose thereon. The wheel D furnishes power for the feeder, and the loose wheel assists in turning the device at the end of a row.

E is the tongue attached to the frame in any suitable manner, preferably as shown in Fig. 1, being journaled on the axle and having its rear end extended to form a support for the seed-box, hereinafter described.

F is the clevis attached to the front end of the tongue and provided with a plurality of holes, by means of which the depth of the plow may be readily adjusted.

G is a screw-threaded rod passed through the side bars and through the rear end of the tongue and provided with an adjusting-nut $b$, by means of which the rear ends of the side bars may be spread out slightly or drawn together when desired.

H are metallic standards attached to the side bars, near the rear ends thereof, and I are the plows provided with shanks vertically adjustably secured to the said foot-pieces by means of the holes $c$ and removable pins $d$.

J are the handles, and K are rods bracing the handles and connecting them to the side bars, as shown.

L is the seed-box supported at its forward end on the rear end of the tongue and by attachment to the handles.

Journaled in suitable bearings in the side bars of the frame just to the rear of the seed-box is the transverse shaft M, carrying a sprocket-wheel N, and on the shaft or axle C is another sprocket-wheel N' in line with the sprocket-wheel N.

Carried by a suitable transverse shaft $e$, suitably journaled in the sides of the seed-box, is a sprocket-wheel O, and O' is an endless sprocket-chain passed around the said three sprocket-wheels to give motion to the feed-wheel attached to the transverse shaft M and at the same time to give motion to the wheel O.

The feed-wheel P is fast on the shaft M, and the fingers $f$ thereon work through a slot in the bottom of the seed-box and serve to drag the seed from the box.

Q is a plow arranged beneath the seed-box, and carries at the upper end of its shank a spout, through which the seed falls as it comes from the seed-box. This spout P' may be of any suitable shape and material and may be attached to the seed-box or to the shank of the plow in any well-known manner.

When the device is to be used as a cotton-planter, for which purpose it is shown arranged in Fig. 1, the slot $g$ in the bottom of the seed-box is provided, as follows: In the bottom of the box is formed an elongated slot $h$, to each side of which are formed guides $i$, in which works a slide R, formed at one end with a slot or opening $j$ and at the other end with a slot $k$, in which works a set or thumb screw $l$, which serves to attach the slide in place and renders it adjustable to make the opening through which the seed flows larger or smaller, as may be desired. The fingers of the feed-wheel work through the opening $j$ and drag the seed from the box in the revolution of the said feed-wheel.

S is a guard or dog hung on a pivot and arranged on the bottom of the seed-box in such a manner that as the pins on the feed-wheel pass through the opening or slot the dog will fly back and retain the seed till the next finger comes into play. This dog should be preferably spring-actuated, to insure its always falling back.

T is a guard formed integral with or attached to the bottom of the seed-box for the purpose of keeping the seed off of the feed-wheel.

When the device is to be used as a corn-planter, the arrangement shown in Fig. 3 is resorted to. In this construction U is the feed-slide pivotally attached to the crank $m$, to which motion is imparted through the medium of the sprocket wheels and chain, as in Figs. 1 and 2, and this slide works in guides $n$ in the bottom of the box, a brush $o$ being provided to regulate the quantity of seed deposited by the slide.

The plows are readily detachable, so that one, two, or more may be employed, as the nature of the work may require.

What we claim as new is—

The combination, with the frame and the axle journaled in boxes on said frame and in bearings on the tongue, of the tongue journaled on the axle, the cross-bar A', connecting the side bar of the frame and passed through the tongue, and the screw-threaded rod G, passed through the side bars of the frame and through the rear end of the tongue and provided with adjusting-nut $b$, substantially as described.

In testimony whereof we affix our signatures in presence of two witnesses.

WILLIAM R. GREEN.
JAMES A. GREEN.

Witnesses:
S. A. ROACH,
T. L. CULVER.